United States Patent [19]

Wirth

[11] Patent Number: 5,377,921

[45] Date of Patent: Jan. 3, 1995

[54] PROCEDURE AND DEVICE FOR TREATING WASTE MATERIALS, IN PARTICULAR ORGANIC CATERING WASTE

[75] Inventor: Heinz Wirth, Langenargen, Germany

[73] Assignee: SQ Services AG, Steinhausen, Switzerland

[21] Appl. No.: 122,290

[22] Filed: Sep. 17, 1993

[30] Foreign Application Priority Data

Sep. 18, 1992 [DE] Germany .............................. 4231293

[51] Int. Cl.$^6$ .............................................. B02C 18/40
[52] U.S. Cl. ................................... 241/29; 241/46.02; 241/DIG. 38
[58] Field of Search ................... 241/29, 38, 41, 46.02, 241/46.013, DIG. 38

[56] References Cited

U.S. PATENT DOCUMENTS

| | | | |
|---|---|---|---|
| 3,565,350 | 2/1971 | Combs et al. | 241/152.2 |
| 5,089,228 | 2/1992 | Meijer | 422/37 |
| 5,114,081 | 5/1992 | Takenaka | 241/79 |
| 5,123,600 | 6/1992 | Takenaka | 241/46.013 |
| 5,129,590 | 7/1992 | Shinya | 241/46.013 |

FOREIGN PATENT DOCUMENTS

| | | |
|---|---|---|
| 946547 | 8/1956 | Germany . |
| 3844700C2 | 8/1991 | Germany . |

OTHER PUBLICATIONS

Patent Abstract of Japan, C-597, May 17th, 1989, vol. 13/No. 211.
Patent Abstract of Japan, C-896, Dec. 19th, 1991, vol. 15/No. 504.

*Primary Examiner*—Mark Rosenbaum
*Assistant Examiner*—John M. Husar
*Attorney, Agent, or Firm*—Spencer, Frank & Schneider

[57] ABSTRACT

An apparatus for treating waste material, particularly organic catering waste, includes a hopper having an outlet at a bottom part thereof; a comminuting device adjoining the hopper for receiving waste material from the hopper; a chamber having an upper portion and a lower portion; and a raising device having an inlet and an outlet. The outlet of the raising device opens into the hopper above the hopper outlet and into the upper portion of the chamber, whereby waste material lifted by the raising device is discharged in part into the hopper and in part into the upper portion of the chamber. The apparatus further has a supply device situated below an outlet of the comminuting device and in the lower portion of the chamber. The supply device advances waste material from an outlet of the comminuting device and from the lower portion of the chamber to the inlet of the raising device.

11 Claims, 1 Drawing Sheet

PROCEDURE AND DEVICE FOR TREATING WASTE MATERIALS, IN PARTICULAR ORGANIC CATERING WASTE

BACKGROUND OF THE INVENTION

The invention relates to a procedure and a device for treating waste materials by comminuting and mixing.

The treatment of waste materials is today gaining ever greater economic significance. On the one hand, it is important to keep the volume of waste as small as possible for economical disposal, i.e. bulky waste must be brought into a compact form. On the other hand, composting is gaining significance, in particular in the case of organic waste materials.

A procedure and device in particular for the composting of waste materials from private households, restaurants and the like, which can be used at the place where the waste is created, have become known with DE 38 44 700. In this case, it is a procedure in which the waste is finely comminuted and mixed, with fresh air being supplied. In this case, an aerobic conversion process takes place, as the result of which a compostable material remains. In this specification, it is furthermore proposed to control the fresh-air supply and its temperature during the procedure.

The device for implementing the procedure indicated above comprises a housing, a mixing and comminuting device as well as a conveying device for emptying the housing.

This device as well as the associated procedure have the disadvantage that the desired result is not achieved in any case with any consistency of the waste to be treated. In particular in the case of a high moisture content, the mixing alone of the comminuted waste does not lead to sufficient airing, as a result of which an aerobic conversion is prevented and an undesirable fermentative process is set going. Moreover, conglutinations and accumulations arise inside the material flow in this case, airing no longer being guaranteed in these regions, which leads to fermentative processes which again are undesirable. The accumulated material moreover leads to hindrances in the overall working run of such a composting installation.

SUMMARY OF THE INVENTION

An object of the invention is therefore to produce a procedure and a device of the type mentioned in the introduction, which are suitable to bring waste mixtures of any consistency and in particular also with a high moisture content into a compact and thoroughly mixed form, a good airing remaining guaranteed for conversion of organic waste materials in an aerobic conversion process.

This object and others to become apparent as the specification progresses, are accomplished by the invention, according to which, briefly stated, the apparatus for treating waste material, particularly organic catering waste, includes a hopper having an outlet at a bottom part thereof; a comminuting device adjoining the hopper for receiving waste material from the hopper; a chamber having an upper portion and a lower portion; and a raising device having an inlet and an outlet. The outlet of the raising device opens into the hopper above the hopper outlet and into the upper portion of the chamber, whereby waste material lifted by the raising device is discharged in part into the hopper and in part into the upper portion of the chamber. The apparatus further has a supply device situated below an outlet of the comminuting device and in the lower portion of the chamber. The supply device advances waste material from an outlet of the comminuting device and from the lower portion of the chamber to the inlet of the raising device.

Thus, according to the invention, the comminuted waste is constantly supplied to a dispersing (scattering) device. During the subsequent dispersing operation, i.e. the free fall of small particles, these individual particles are exposed to air on all sides. A conglutination of the comminuted material is thus successfully avoided. As a result of the good ventilation of the waste mixture, the aerobic decomposition of organic waste materials is optimally promoted. A waste mixture with too high a moisture content can moreover be dried well in this manner.

To carry out said treatment of waste materials, a dispersing device is proposed, which has a raising device and a supply device for the raising device. At the upper end of the raising device, the waste mixture to be treated is dispersed in a lateral direction in order to fall back into the sump situated in the container, the waste mixture is exposed to air on all sides during the fall. The supply device collects the filling material which has fallen down within a large radius, in order to supply it again to the lower end of the raising device.

Advantageously, the temperature, the moisture and the fresh-air supply are accordingly regulated, depending upon the consistency of the respective material and its treatment stage, by corresponding devices. In this manner, an optimum environment for said aerobic decomposition process can be adjusted.

It is of particular advantage if the supply device extends over the greater part of the housing floor which is adapted to the shape of the supply device in such a manner that the sump can be taken in virtually completely by it. By these means, undesirable deposits and conglutinations of the waste mixture in the sump are avoided as virtually the entire waste mixture is repeatedly supplied to the raising device and consequently runs through the dispersing process.

It is of particular practical significance to use the raising device of the dispersing device simultaneously as a conveying device for emptying the housing. By means of a suitable deflection means, for example a flap, the material flow can at the upper end of the raising device alternatively be deflected into an emptying channel or, as indicated above, be dispersed laterally, in order subsequently scattered to be sprinkled down onto the sump.

It is advisable to mount the hopper of the comminuting device below the upper end of the raising device, as a result of which, during the dispersing operation, a part of the waste mixture falls into the comminuting device again and consequently is supplied to the comminuting operation again. As a result, the waste mixture is made constantly finer.

In a technically particularly elegant solution, the supply device and the raising device are designed simultaneously as mixing mechanisms. This can be effected for example by the supply device and the raising device being designed respectively as two double worms working in opposite directions. As a result of this design, the waste mixture is constantly thoroughly mixed during transport so that, in the course of the mixture simultaneously being made finer by the comminuting device, a homogeneous fine mixture is produced over time.

For the better distribution of the waste mixture during the dispersing inside the housing, provision is to be made for the mounting of metal dispersing sheets for deflecting the material flow into the respectively desired direction. The housing can moreover be thermally insulated for utilization of the process heat arising during the decomposition operation.

An exemplary embodiment of the invention is illustrated in the drawing and explained in greater detail in the following description.

DESCRIPTION OF THE PREFERRED EMBODIMENT

Figure 1:
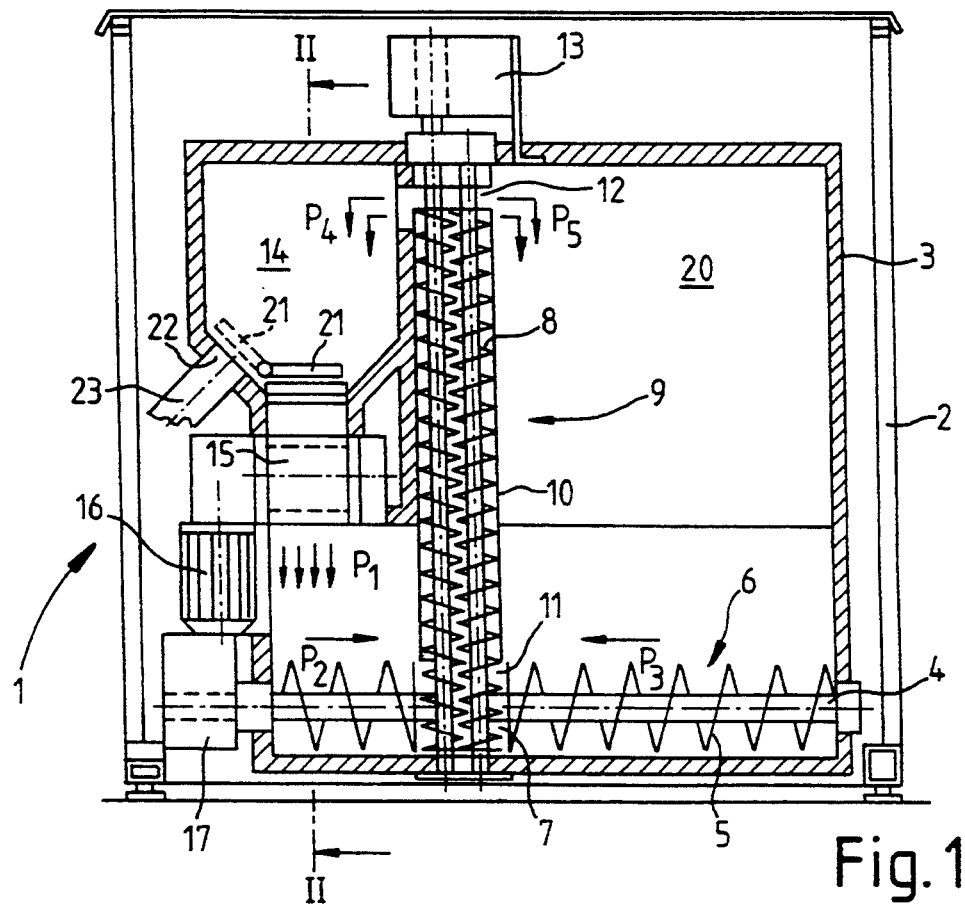
FIG. 1 shows a longitudinal section through a composting installation according to the invention and FIG. 2 shows a sectional view along line II—II in FIG. 1.

The composting installation 1 in FIG. 1 is mounted on a frame 2. It comprises a housing 3 which is passed through in its lower region by shafts 4 of two horizontal worm conveyors 5 which form the supply device 6. The helices of the worm conveyors 5 are interrupted in the central region 7 of the worm conveyors 5 in order to leave space for a raising device 9 comprising two standing raising worms 8. The two raising worms 8 are encased by a wall 10 which is interrupted at the lower end 11 and at the upper end 12 of the raising worms. Illustrated above the raising worms 8 is the drive 13 for the raising worms 8. Situated on the left side of the raising worms 8 is a filling hopper 14 which opens into a cutting mechanism 15. Illustrated on the left side of the housing 3 is the cutting-mechanism drive 16 and the drive 17 for the worm conveyors.

Figure 2:
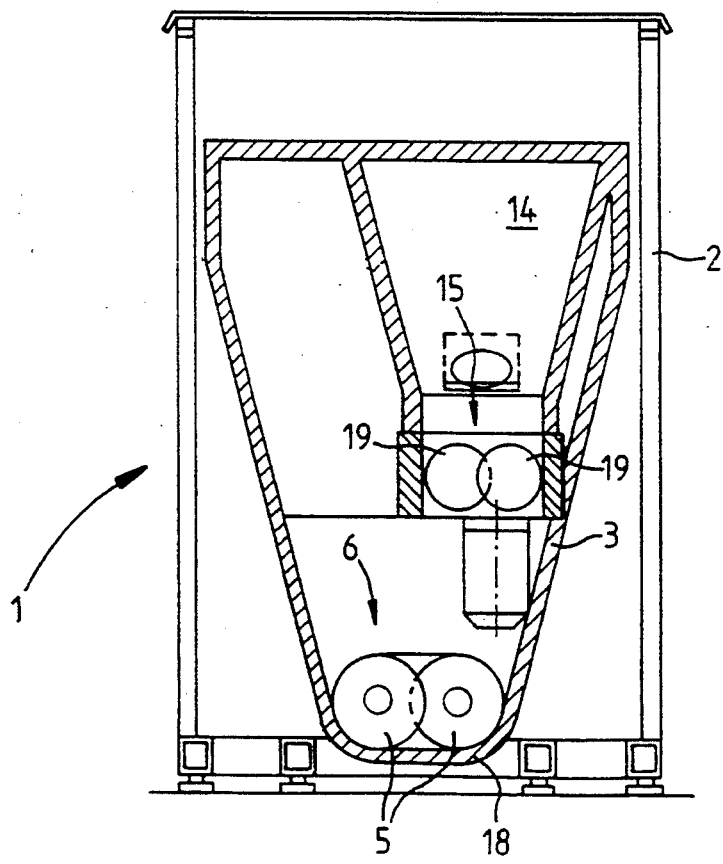

In the illustration in FIG. 2, the arrangement of the supply device 6 in the form of two worms 5 can be seen better. The trough-shaped design of the housing bottom 18 is also made clear in the cross section according to FIG. 2. The cutting mechanism 15, which consists of drivers and cutting blades rotating on two axes, is indicated by two circles 19.

To fill the installation, the waste material is filled into the filling hopper 14 via a ramp (not shown), The filling material falls via the cutting mechanism 15 in the direction of the arrows $P_1$ onto the trough-shaped housing bottom 18 in order there to form the so-called sump. Via the double worm conveyor 5, the filling material is supplied to the raising worms 8 from the left in arrow direction $P_2$ and from the right in direction $P_3$. These convey the comminuted waste to the upper end 12 where, as a result of the conveying speed in combination with the opening size of the wall 10, the filling material is dispersed laterally. A part of the filling material falls back along the arrows $P_4$ into the filling hopper 14, after which it is further comminuted by the cutting mechanism 15. The other part falls back along the arrows $P_5$ through a chamber 20 directly onto the sump which lies on the housing bottom 18.

Thus, a dispersing device is provided, which constantly loosens and additionally comminutes more and more finely the filling material over time. The constant dispersing operation ensures optimum airing. As a result of the design of both the supply device 6 and the raising device 9 in the form of two worms 5 and 8 working in opposite directions, the filling material is moreover constantly mixed during the circulating operation.

For emptying, the filling hopper 14 is in this exemplary embodiment closed towards the bottom by a flap 21 which simultaneously opens an opening 22 in the side wall of the filling hopper 14 to a discharge shaft 23. In FIG. 1, the flap 21 effects discharge through the opening 22 in the solid-line position, while closing the opening 22 in the phantom-line position. By these means, that part of the filling material which falls into the filling hopper 14 is removed from the composting installation, and the latter is consequently emptied over time.

For further environmental improvement for the aerobic decomposition process, additional devices (not shogun), such as spray nozzles for water, ventilation devices, measuring devices for air humidity, temperature or the like, as well as heating or cooling devices etc., of known type can additionally be built in.

I claim:

1. A method of treating waste material, comprising the following steps:
    (a) introducing the waste material into a hopper;
    (b) advancing the waste material from the hopper to a cutting mechanism;
    (c) comminuting the waste material by the cutting mechanism;
    (d) advancing the waste material from the cutting mechanism to a horizontal feeder;
    (e) advancing the waste material by the horizontal feeder to a raising feeder;
    (f) lifting the waste material by the raising feeder to a level of an input of the hopper;
    (g) introducing a first part of the waste material from the raising feeder into the hopper for recirculation;
    (h) introducing a second part of the waste material from the raising feeder into a chamber;
    (i) allowing the second part of the waste material to descend by gravity through the chamber to the horizontal feeder; and
    (j) advancing the second part of the waste material by the horizontal feeder to the raising feeder for recirculation.

2. The method as defined in claim 1, further comprising the step of mixing the waste material prior to performing steps (g) and (h).

3. The method as defined in claim 1, further comprising the steps of controlling at least one of temperature and moisture of the waste material subsequent to step (c) dependent from consistency and treatment state of the waste material.

4. The method as defined in claim 1, further comprising the step of introducing fresh air.

5. The method as defined in claim 4, further comprising the step of regulating the fresh air.

6. An apparatus for treating waste material, comprising:
    (a) a hopper having an outlet at a bottom part thereof;
    (b) a comminuting device adjoining said outlet for receiving waste material from said hopper;
    (c) means for defining a chamber having an upper portion and a lower portion;
    (d) a raising device having an inlet and an outlet; said outlet of said raising device opening into said hopper above the outlet of said hopper and into said upper portion of said chamber, whereby waste material lifted by said raising device is discharged in part into said hopper and in part into said upper portion of said chamber; and (e) a supply device situated below an outlet of said comminuting device and in said lower portion of said chamber; said supply device including means for advancing waste material from an outlet of said comminuting device and from the lower portion of said chamber to the inlet of said raising device.

7. The apparatus as defined in claim 6, wherein said means defining said chamber comprises a housing having a housing bottom; said supply device being situated immediately above said bottom and-extending over a preponderant part of said housing bottom.

8. The apparatus as defined in claim 6, further wherein said hopper has a side wall and an opening in said side wall; further comprising a flap having a position in which said hopper is closed towards a hopper bottom and is open towards said opening in said side wall; and a discharge shaft communicating with the opening in said side wall, whereby waste material is discharged from said apparatus in said position of said flap.

9. The apparatus as defined in claim 6, wherein said comminuting device is situated in said chamber.

10. The apparatus as defined in claim 6, wherein said supply device and said raising device include means for mixing said waste material.

11. The apparatus as defined in claim 6, wherein said raising device and said supply device each comprises two cooperating, oppositely rotated worm conveyors.

* * * * *